United States Patent Office 2,743,773
Patented May 1, 1956

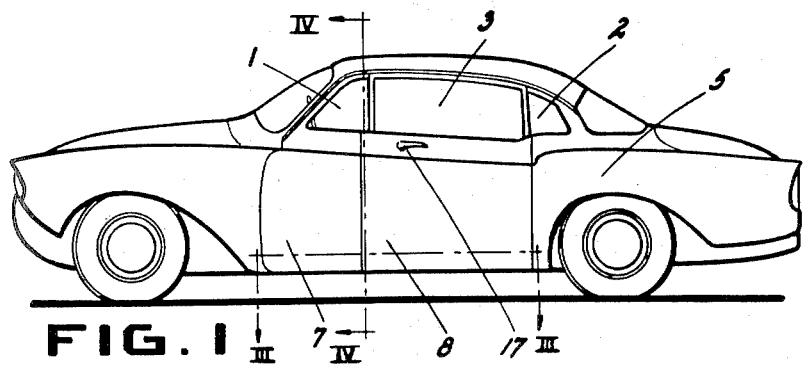
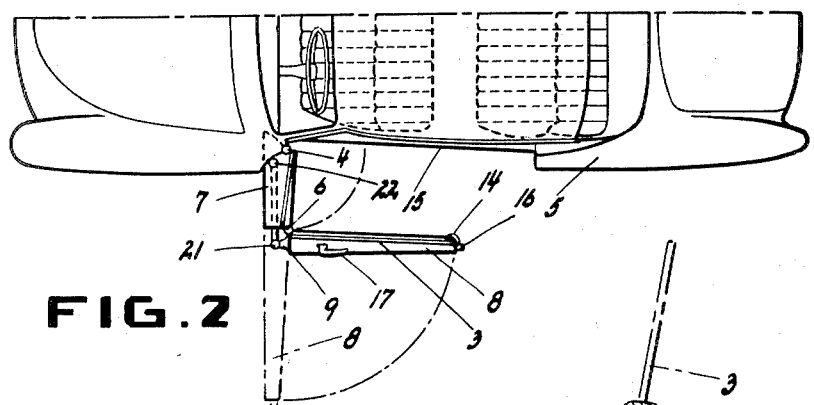
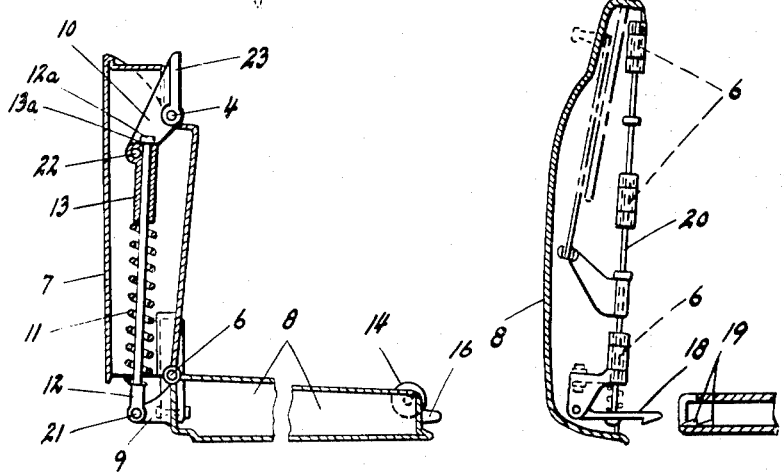
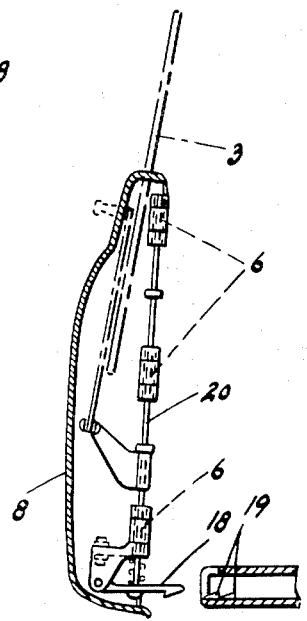
Axel H. Weiertz
INVENTOR

2,743,773

TWO-DOOR AUTOMOBILE WITH FOLDING DOORS

Axel Hugo Weiertz, Malmö, Sweden

Application February 23, 1954, Serial No. 412,009

Claims priority, application Sweden March 18, 1953

4 Claims. (Cl. 160—213)

This invention relates to two-door passenger autocars, i. e. cars having, in addition to a front seat for the driver at least, a rear seat for passengers, and on either side a single door opening outwards for providing entrance both to the front seat and to the rear seat of the car.

The object of the invention is to provide the car on either side with a single door sufficiently wide for permitting passengers to step into and out of the car behind the front seat without this having to be tilted forward in the manner hitherto usual in two-door passenger autocars, and without the great width of the door becoming inadvantageous with respect to traffic safety, or impractical with respect to the frequently cramped spaces in parking lots and garages.

For this object and such further objects as may appear from the following description of a preferred form of the invention illustrated in the accompanying drawing, the invention consists in the device and in the combination and construction of parts hereinafter described with reference to the drawing and finally pointed out in the appendant claims.

In the drawing:

Fig. 1 is a side view of a closed passenger autocar having, in addition to a front seat for the driver at least, a rear seat for passengers, and on either side a single door devised and constructed in accordance with the invention, said door being shown in closed position.

Fig. 2 is a corresponding plan view with the door shown in an open position.

Figs. 3 and 4 are a horizontal section on line III—III in Fig. 1 and a vertical section on line IV—IV in Fig. 1, respectively, on a larger scale, through the door.

The passenger car shown in Figs. 1 and 2 has on either side a door which is hinged at its leading edge and opens outwards, a front ventilation window 1 which is disposed in the door, a rear ventilation window 2, which is disposed in the body frame, and between these two ventilation windows 1 and 2 a window 3, which is disposed in the door and movable up and down in its own plane. The door extends from its leading edge, at which it is suspended by means of hinges 4 in the body frame, as far back as the rear ventilation window 2 and the rear fender 5. Preferably approximately in line with the place where the front ventilation window 1 and the window 3 in the door adjoin the door is divided vertically into two portions united by means of hinges 6 (Figs. 2 and 3), viz. a front portion 7 suspended at its leading edge by means of the hinges 4 in the body frame and a wider rear portion 8 suspended at its leading edge in the rear end of said front portion 7 by means of the hinges 6. The front ventilation window 1 is thus disposed in the front door portion 7 and the movable window 3 is disposed in the wider rear door portion 8. When the door is closed, the rear door portion 8 forms a smooth continuation rearwards of the front door portion 7, as is outlined through the position shown in dot and dash lines in Fig. 2, of the door portion 8 in relation to the door portion 7, in which position the swingability of the rear door portion 8 in relation to the front door portion 7 about the hinges 6 is limited in the same direction as the one in which the door is swung about the hinges 4 when the door is opened. Thus the door can be opened, as shown in Fig. 2, by the exertion of an outwardly directed force only on the front door portion 7 or only on the rear door portion 8 or on both door portions simultaneously.

Means are provided for automatically imparting parallel motion to the wider rear portion 8 of the door in relation to the car body when opening and closing the door. As illustrated in Figs. 2 and 3, these means comprise a link rod structure 12—13 connecting a fixed point 21 on the rear portion 8 of the door to a fixed point 22 on the car body and forming together with the car body and the rear and front door portions 7 and 8 and their respective hinges 4 and 6 a parallelogram having the meeting ends of its sides articulated to one another at said points 21 and 22 and at points on the axes of the hinges 4 and 6. The link rod structure 12—13 is housed in the front portion 7 of the door, for which purpose the points 22 and 21 are disposed in front of the respective hinges 4 and 6, the point 21 preferably being carried by an arm 9 projecting from the front edge of the rear door portion 8, and the point 22 preferably being carried by an arm 10 projecting from a part 23 of the hinge 4 secured to the car body. The link rod structure 12—13 comprises two relatively displaceable parts 12 and 13 having coacting stops 12a and 13a limiting their relative displacement in the direction towards an increase of the length of the link rod 12—13, and a spring 11 acting between the rod parts 12 and 13 and biasing them in said direction in relation to each other. The front portion 7 of the door is swingable through an angle of about 90° from closed to fully open position, and when the front portion 7 of the door is in fully open position, the rear portion 8 of the door is biased by the link rod 12, 13 and its spring 11 to a position substantially at right angles to the front portion 7 and is swingable by hand further outwards against the action of the spring 11 of the link rod 12, 13.

At the closing of the door the rear door portion 8 is guided due to a guide roller 14 disposed at its lower rear edge cooperating with a guide rail 15 (Fig. 2) in the body frame, so that projections 16 provided in the rear edge of the rear door portion are guided into guides disposed for them in the body frame in order to support the door in its closed position.

In Figs 1 and 2 reference numeral 17 designates an outer door handle which can preferably be disposed on the rear door portion 8 while a handle (not shown) can preferably be disposed at the inside of either door portion. In order that the locking means automatically locking the door in the closed position at the closing of the door, may be operated by any one of the door handles, this locking means can be adapted to be actuated from the handles by means of a lifting rod or the like disposed coaxially with the hinges 6 between the two door portions. According to the embodiment outlined in Fig. 4 the locking means can for instance consist of a spring actuated locking catch 18 disposed in the rear door portion 8 near its lower edge for cooperation with locking shoulders 19 in the body frame. The lifting of the locking catch 18 out of engagement with the locking shoulders 19 for unlocking the door by means of the door handles can take place by means of the lifting rod 20 connected in one suitable way or the other to the door handles and arranged coaxially with the hinges 6.

What I claim and desire to secure by Letters Patent is:

1. The combination comprising an autocar body having on each side a single door opening outwards and comprising a front portion hinged at its front edge to said car body and a rear portion hinged at its front edge to the rear edge of said front portion, said rear portion of said door being of greater width than said front portion, and means comprising a link rod connecting a fixed point on said rear portion of said door to a fixed point on said car body and forming together with said car body and said door portions and their respective hinges a parallelogram having the meeting ends of its sides articulated to one another at said points and at points on the axes of said hinges for imparting parallel motion to said relatively wider rear portion of said door in relation to said car body when opening and closing said door.

2. The combination claimed in claim 1, said fixed point on said car body and said fixed point on said rear portion of said door being disposed in front of the axes of said hinges of said front portion and said rear portion, respectively, of said door, and said link rod connecting said points being mounted for swinging movement with said front portion of said door and housed therein.

3. The combination claimed in claim 2, said link rod comprising two relatively displaceable parts having coacting stops limiting their relative displacement in the direction towards an increase of the length of said rod, and spring means biasing said rod parts in said direction in relation to each other.

4. The combination claimed in claim 3, said front portion of said door being swingable through an angle of about 90° from closed to fully open position, and said rear portion of said door when said front portion is in fully open position, being biased by said link rod to a position substantially at right angles to said front portion and being swingable by hand further outwards against the action of said spring means of said link rod.

References Cited in the file of this patent

UNITED STATES PATENTS

| | | |
|---|---|---|
| 1,470,690 | Lover | Oct. 16, 1923 |
| 2,581,797 | Jordan | Jan. 8, 1952 |
| 2,606,059 | Wernig | Aug. 5, 1952 |

FOREIGN PATENTS

| | | |
|---|---|---|
| 894,788 | France | Mar. 20, 1944 |